United States Patent
Marques et al.

(10) Patent No.: US 9,114,872 B2
(45) Date of Patent: Aug. 25, 2015

(54) METHOD OF OPERATING ACTUATORS SIMULTANEOUSLY FOR MOVING AIRCRAFT FLAPS, AN AIRCRAFT FLAP DRIVE DEVICE, AND AN AIRCRAFT PROVIDED WITH SUCH A DEVICE

(75) Inventors: Frederic Marques, Paris (FR); Guillaume Mercier, Paris (FR); Stephane Menio, Paris (FR)

(73) Assignee: SAGEM DEFENSE SECURITE, Paris (FR)

(*) Notice: Subject to any disclaimer, the term of this patent is extended or adjusted under 35 U.S.C. 154(b) by 226 days.

(21) Appl. No.: 14/002,062

(22) PCT Filed: Feb. 29, 2012

(86) PCT No.: PCT/EP2012/053409
§ 371 (c)(1),
(2), (4) Date: Aug. 28, 2013

(87) PCT Pub. No.: WO2012/117009
PCT Pub. Date: Sep. 7, 2012

(65) Prior Publication Data
US 2013/0334372 A1 Dec. 19, 2013

Related U.S. Application Data

(60) Provisional application No. 61/552,999, filed on Oct. 28, 2011.

(30) Foreign Application Priority Data

Mar. 1, 2011 (FR) ...................................... 11 51645

(51) Int. Cl.
*B64D 45/00* (2006.01)
*B64C 13/00* (2006.01)
*B64C 13/16* (2006.01)
*B64C 13/50* (2006.01)

(52) U.S. Cl.
CPC ................. *B64C 13/16* (2013.01); *B64C 13/50* (2013.01); *B64C 13/503* (2013.01); *B64D 45/00* (2013.01); *B64D 2045/001* (2013.01)

(58) Field of Classification Search
CPC ........ B64C 13/16; B64C 13/24; B64C 13/26; B64C 13/50; B64C 9/02; B64C 9/16; B64C 9/17; B64C 9/18; B64C 9/19; B64C 9/20; B64C 9/21; B64C 9/22; B64C 9/23; B64C 9/24; B64C 9/26; B64C 2009/005; B64D 2045/001

See application file for complete search history.

(56) References Cited

U.S. PATENT DOCUMENTS

2010/0282899 A1* 11/2010 Heintjes ....................... 244/99.5
2011/0062282 A1* 3/2011 Richter et al. ................ 244/99.4

FOREIGN PATENT DOCUMENTS

| DE | 10 2005 017307 A1 | 10/2006 |
| EP | 0 831 027 A2 | 3/1998 |
| EP | 1 038 765 A1 | 9/2000 |
| EP | 1 462 361 A1 | 9/2004 |
| EP | 1 739 009 A1 | 1/2007 |

* cited by examiner

*Primary Examiner* — Tien Dinh
*Assistant Examiner* — Aaron Rodziwicz
(74) *Attorney, Agent, or Firm* — Muncy, Geissler, Olds & Lowe, P.C.

(57) ABSTRACT

A method of operating actuators simultaneously for moving at least two aircraft movable aerodynamic surfaces, the method comprising the steps of: controlling the actuators to move the aerodynamic surfaces towards a predetermined position; during the movement, detecting a slowest actuator; and adapting the control of the actuators to match the actions of the slowest actuator. A drive device for aerodynamic surfaces and an aircraft including such a device.

10 Claims, 1 Drawing Sheet

METHOD OF OPERATING ACTUATORS SIMULTANEOUSLY FOR MOVING AIRCRAFT FLAPS, AN AIRCRAFT FLAP DRIVE DEVICE, AND AN AIRCRAFT PROVIDED WITH SUCH A DEVICE

FIELD OF THE INVENTION

The present invention relates to a method of operating actuators simultaneously for moving aircraft movable aerodynamic surfaces such as flaps. The invention also provides an aircraft movable aerodynamic surface drive device and an aircraft provided with such a device.

BACKGROUND OF THE INVENTION

Most airplanes are fitted with flaps for increasing the lift of the airplane while flying at relatively low speed such as while landing and while taking off. Depending on flying conditions, the flaps must be capable of being taken to different positions, generally a retracted position, and positions in which they are extended by 25%, 50%, 75%, and 100%, respectively.

Each wing of the airplane is thus provided with at least one flap. The flaps must be moved simultaneously and without twisting into their various positions, with any offset in position between the two flaps giving rise to an unbalance of the airplane that, if large, could lead to the airplane crashing.

The movement of flaps is thus generally provided by a single motor that is arranged in the fuselage of the aircraft and that rotates shafts extending inside the wings as far as the flaps. The shafts are coupled to the flaps in such a manner that rotating the shafts in one direction or the other causes the flaps to be extended or retracted.

Such devices are heavy, bulky, and installing them in an airplane is very constraining.

OBJECT AND SUMMARY OF THE INVENTION

An object of the invention is to provide means enabling the drawbacks of prior art devices to be remedied at least in part while guaranteeing that the movable aerodynamic surfaces are moved reliably.

The invention results from a different approach seeking to associate at least one actuator with each movable aerodynamic surface in such a manner that the actuator of one flap in a pair of movable aerodynamic surfaces is mechanically independent of the actuator of the other flap in said pair of flaps. However, it then becomes necessary to provide dedicated means for ensuring that the movements of the movable aerodynamic surfaces are synchronized.

To this end, the invention provides a method of operating actuators simultaneously for moving at least two aircraft movable aerodynamic surfaces, the method comprising the steps of:
  controlling the actuators to move the movable aerodynamic surfaces towards a predetermined position;
  during the movement, detecting a slowest actuator; and
  adapting the control of the actuators to match the actions of the slowest actuator.

Thus, each movable aerodynamic surface is associated with at least one actuator enabling the movable aerodynamic surface to be moved into its various positions. Under such circumstances, the actuators are distributed along the wing of the aircraft, thereby making it easier to install them. The method of the invention makes it possible to guarantee that the movements of the movable aerodynamic surfaces are synchronized, so as to avoid any offset occurring between them, by controlling the actuators so that they all track the slowest actuator, i.e. the actuators are controlled so that all of them operate at the speed of the actuator that is the slowest.

The invention also provides a drive device for driving the movable aerodynamic surfaces of an aircraft, the device comprising a control unit connected to actuators for moving the movable aerodynamic surfaces and programmed to implement the method of the invention.

Finally, the invention provides an aircraft including a fuselage with a respective wing on either side thereof, each wing being provided with at least one movable aerodynamic surface, the movable aerodynamic surfaces being coupled to a drive device of the above type.

BRIEF DESCRIPTION OF THE DRAWINGS

Other characteristics and advantages of the invention appear on reading the following description of a particular, non-limiting implementation of the invention.

Reference is made to the accompanying drawings, in which.

MORE DETAILED DESCRIPTION

Figure 1:
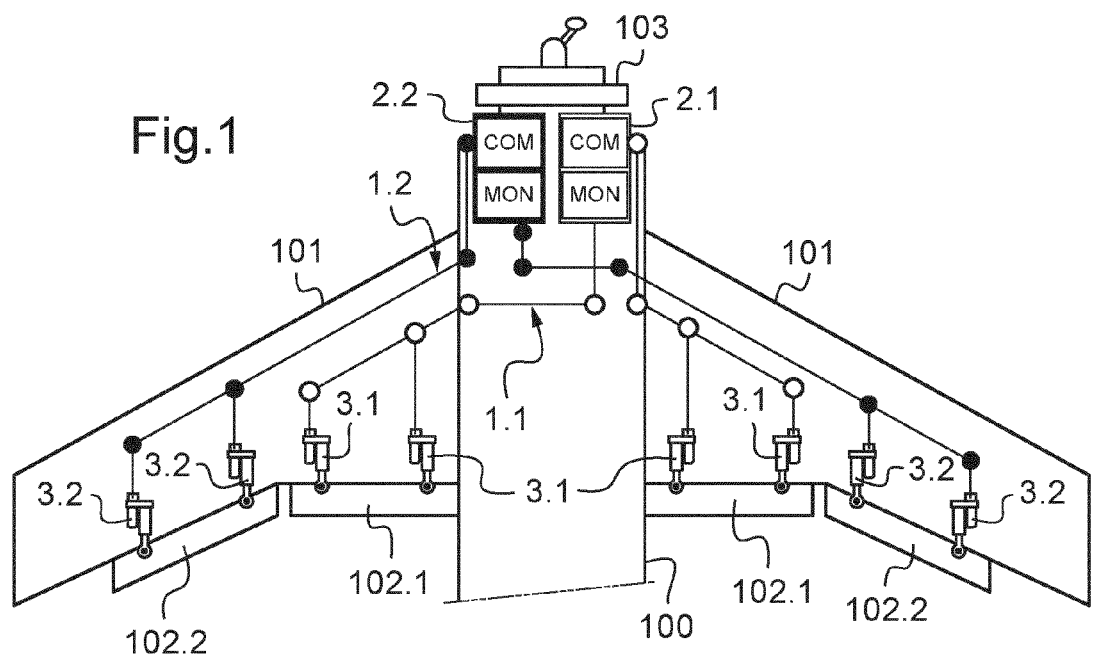
FIG. 1 is a fragmentary schematic view of an aircraft in accordance with the invention.
Figure 2:
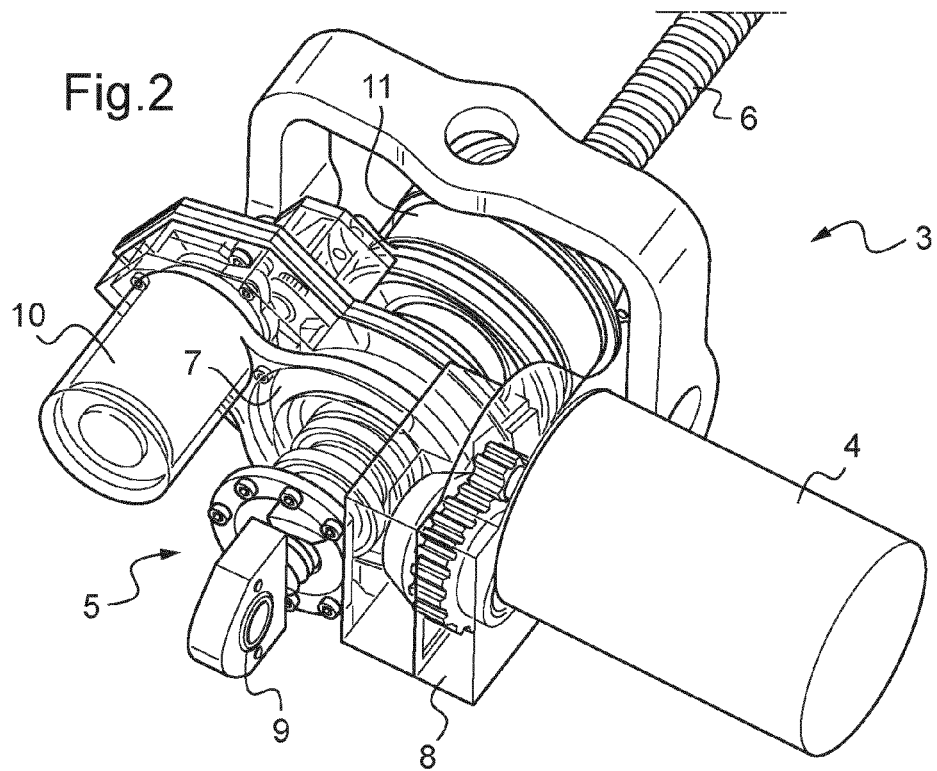
FIG. 2 is a schematic view in perspective of an actuator.

The invention is described more particularly in its application to moving the flaps of an aircraft between their various positions, there generally being five such positions, namely: retracted, and extended by 25%, 50%, 75%, or 100%.

With reference to the figures, an aircraft comprises a fuselage 100 with respective wings 101 extending from either side thereof, each wing being fitted in this example with two flaps 102 (numerical reference 102 is associated with an identifier .1 or .2 in order to distinguish between the two flaps; the same applies to the numerical references for all of the elements associated specifically with one or the other of these flaps). The flaps 102.1 and 102.2 are coupled to a respective drive device generally referenced 1.1 or 1.2 arranged to move the flaps 102.1 or 102.2 into each of their positions.

The movements of the flaps 102.1, 102.2 are controlled by the pilot of the aircraft via controls that are connected to the central control unit 103, itself known. The control unit 103 manages the operation of the various pieces of flight and navigation equipment of the aircraft. The control unit 103 is connected to the drive devices 1.1, 1.2 in order to transmit orders to them for moving the flaps 102.1, 102.2. It is important to observe that the flaps are controlled in pairs, i.e. both flaps 102.1 should be moved simultaneously with each other and both flaps 102.2 should likewise be moved simultaneously with each other.

Since the drive devices 1.1 and 1.2 are identical to each other, only one of them is described below and the numerical references of the corresponding components are mentioned without their identifiers ".1", or ".2", except under exceptional circumstances.

Each drive device 1 has a control unit 2 connected to the control unit 103 and dedicated to controlling the flaps 102 to which the drive device 1 is coupled.

The control unit 2 is connected to actuators, given overall reference 3, that are coupled to the corresponding flaps 102. In the embodiment described, two actuators 3 are associated with each flap 102.

Each actuator 3 comprises a synchronous alternating current (AC) motor 4 of the "brushless" type having an outlet shaft driving a screw jack 5 of the ball- or roller-screw type.

The screw jack 5 has a wormscrew 6 with a nut 7 mounted thereon that is constrained in translation with a stationary structure and that is driven in rotation by the outlet shaft of the engine 4 via a stepdown gearbox 8. The screw 6 has one end 9 connected to the flap 102 in such a manner as to be prevented from turning, and it drives the flap on moving axially.

The screw 6 is fitted with end-of-stroke stops (not shown) that limit the maximum amplitude through which the screw 6 can be moved.

Each actuator 3 includes at least a load sensor, a position sensor 10 for sensing the position of the screw 6 (e.g. of the rotary variable differential transformer (RVDT) type), and a position sensor for sensing the position of the motor, which sensor is incorporated in the motor 4 (e.g. of the resolver, code wheel, or optical coder or other type).

Each actuator 3 has a fail-safe brake, referenced 11, arranged in the absence of electricity to prevent the screw 6 from moving in translation. The brake 11 operates in friction and is of conventional structure. The brake 11 has a first plate constrained to rotate with the nut 7 and a second plate constrained to rotate with the structure and movable in translation relative to the first plate between a contact position (dry friction) against the first plate and a position where it is spaced apart from the first plate. The second plate is urged into the contact position by springs and into the spaced-apart position by a coil that acts, when powered, to attract the second plate magnetically. The brake 11 is dimensioned to block the actuator in position when the motor 4 is not powered, or on instruction from the control unit, to oppose the motor 4 and stop it in the event of the motor 4 running away and no longer responding to the control unit 2.

It can be understood that the control unit 2.1 controls the movement of the flaps 102.1 simultaneously with each other and that the control unit 2.2 controls the movement of the flaps 102.2 simultaneously with each other.

The operation of a drive device 1 is described below, which operation is identical both for the drive device 1.1 of the flaps 102.1 and for the drive device 1.2 of the flaps 102.2.

On being put into operation, the control unit 2 executes a start-up mode including in particular a routine for determining the positions of the actuators 3, and a routine for detecting any failure by self-monitoring.

Once start-up mode has been validated, the control unit 2 is in normal operation mode and waits for instructions from the control unit 103.

When the control unit 2 receives an instruction from the control unit 103 to extend the flaps 102 through a certain amplitude, the control unit 2 determines the position that is to be reached and the current that is to be sent to the motors 4. After the brake 11 has been unblocked, the electric motors 4 are powered to enable the motors 4 to perform an acceleration stage, a stage at constant speed, and then a stage in which the motors 4 decelerate on approaching the position that is to be reached, until the motors 4 are stopped when said position is reached. The control unit 2 switches off the power supply to the motors 4 and simultaneously to the brake 11, thereby causing the brake 11 to be actuated so as to block the actuator 3 in position.

The operation of the control unit 2 makes use of two servo-control loops, one concerning position and the other concerning current.

All through the three above-described operating stages, the control unit identifies the slowest motor 4 among the actuators 3 of the flaps 102 and it adapts the control of the motors 4 to set the control of the motors 4 to match the slowest motor 4. This synchronization of the actuators 3 serves to avoid any time offset in the extension of the flaps in the pair of flaps under consideration or any offset between two portions of a given flap that might otherwise not move in parallel, which might jam the flap. Detecting which motor 4 is the slowest and adapting the control of the motors thereto takes place periodically at a frequency that is appropriate for guaranteeing that any offset is less than a maximum acceptable offset value.

By way of example, detecting which motor is the slowest may be performed by comparing the positions of the motors and/or of the screws at a given instant in order to identify which actuator is the furthest behind.

Control is adapted by calculating the advance of each actuator relative to the slowest actuator and in determining a speed that will enable all of the actuators to reach the desired position at the same time as the actuator that is the furthest behind.

Should the delay of the slowest actuator ever exceed a predetermined threshold, then all of the actuators of the drive device are stopped.

Throughout the operation of the control unit 2, the control unit 2 monitors its own operation and the operation of the actuators 3 in order to detect a failure as soon as possible.

Various causes of failure and how they can be detected are listed below:
- jamming of the actuator when the screw remains stationary and the speed of the motor is zero while its current consumption increases;
- failure of the angular position sensor of the motor while its current consumption is normal and movement of the screw 6 is detected;
- an operating error of the control unit 2 as detected by a failure detection routine executed by the control unit 2.

When a failure is detected, execution of a failure mode is triggered in which the control unit 2 informs the central control unit 103 of the aircraft that it is no longer operating and operates the actuators 3 under its control so that they are blocked in position. Thus, in the event of detecting a failure in at least one of the actuators of one of the flaps on one of the wings, the actuators of that flap are stopped and also the actuators of the corresponding flap situated on the other wing, while the actuators of the other flaps are controlled so as to move. In a variant, all of the actuators could be stopped.

Certain failures, in particular those relating to the control unit 2 can be detected by a failure detection routine executed by the control unit 103 or by an external circuit dedicated to monitoring.

Naturally, the invention is not limited to the implementations described but covers any variant coming within the ambit of the invention as defined by the claims.

In particular, the invention is applicable to aircraft of any type other than airplanes, and in particular to drones.

The number of actuators per flap is not less than one and depends, for example, on the length of the flap and/or on the forces to be developed.

The number of flaps per wing is not less than one and may be equal to three. The drive device may be arranged to move more than one flap per wing.

The actuators may present a structure that is different from that shown, and for example: they may be purely linear or purely rotary; they may be hydraulic; they need not have stepdown gearing;

The invention is applicable to other movable aerodynamic surfaces than wing flaps.

What is claimed is:

1. A method of operating actuators simultaneously for moving at least two aircraft movable aerodynamic surfaces, the method comprising the steps of:

controlling the actuators to move the aerodynamic surfaces towards a predetermined position;

during the movement, detecting a slowest actuator; and adapting the control of the actuators to match the actions of the slowest actuator.

2. A method according to claim 1, wherein, when an actuator reaches the predetermined position, that actuator is stopped and the actuator is braked to hold it in the predetermined position.

3. A method according to claim 1, wherein each actuator comprises an electric motor and the method comprises a stage of detecting a failure from a combination of at least some of the following parameters: aerodynamic surface position; motor position; motor power supply current; actuator load.

4. A method according to claim 3, wherein each actuator includes a brake, and the parameters used during the failure detection mode also include the braking torque.

5. A method according to claim 3, wherein, in the event of detecting a failure of at least one of the actuators, all of the actuators are stopped.

6. A method according to claim 3, for controlling at least four aerodynamic surfaces distributed on both wings of the aircraft, wherein, in the event of detecting a failure of at least one of the actuators of one of the aerodynamic surfaces on one of the wings, the actuators of that aerodynamic surface are stopped as are the actuators of the corresponding aerodynamic surface situated on the other wing.

7. A method according to claim 6, wherein the actuators of the other wings are controlled to move.

8. A method according to claim 1, wherein the slowest actuator is detected by comparing the positions of the actuators at a given instant.

9. A device for driving aircraft flaps, the device comprising actuators for moving the aerodynamic surfaces and a control unit that is connected to the actuators and to actuator position sensors and that is programmed to bring the actuators into predetermined positions and to implement the method according to claim 1.

10. An aircraft comprising a fuselage and two aerodynamic surfaces disposed on either side of the fuselage and coupled to a drive device, wherein the drive device is according to the preceding claim.

* * * * *